United States Patent
Jang

(10) Patent No.: US 11,431,400 B2
(45) Date of Patent: Aug. 30, 2022

(54) METHOD AND APPARATUS FOR FORMING A PLURALITY OF BEAMFORMED SIGNALS USING A PLURALITY OF RECEIVED SIGNALS

(71) Applicant: Kookmin University Industry Academy Cooperation Foundation, Seoul (KR)

(72) Inventor: Byung-Jun Jang, Seoul (KR)

(73) Assignee: Kookmin University Industry Academy Cooperation Foundation, Seoul (KR)

( * ) Notice: Subject to any disclaimer, the term of this patent is extended or adjusted under 35 U.S.C. 154(b) by 115 days.

(21) Appl. No.: 17/064,110

(22) Filed: Oct. 6, 2020

(65) Prior Publication Data

US 2021/0105059 A1    Apr. 8, 2021

(30) Foreign Application Priority Data

Oct. 7, 2019  (KR) .......................... 10-2019-0123851
Mar. 26, 2020 (KR) .......................... 10-2020-0036840

(51) Int. Cl.
*H04B 7/08* (2006.01)
*H04L 27/20* (2006.01)
*H04L 27/38* (2006.01)

(52) U.S. Cl.
CPC ......... *H04B 7/086* (2013.01); *H04L 27/2082* (2013.01); *H04L 27/3863* (2013.01)

(58) Field of Classification Search
CPC ........ H04B 7/086; H04B 7/088; H04B 10/60; H04B 17/104; H04B 10/677; H04B 1/16;
(Continued)

(56) References Cited

U.S. PATENT DOCUMENTS 8,260,234 B2    9/2012  Chae et al.
9,294,320 B2 *  3/2016  Shimizu ................. G09G 5/006
(Continued)

FOREIGN PATENT DOCUMENTS

KR    10-2004-0057679 A    7/2004
KR    10-2006-0011201 A    2/2006
(Continued)

OTHER PUBLICATIONS

Jang, Direction Detection Technology: Tutorial, Latest Trends and Research Prospects, Journal of the Korean Electromagnetic Society 30(8), 607-617(11 pages), Aug. 2019.
(Continued)

*Primary Examiner* — Lana N Le
(74) *Attorney, Agent, or Firm* — Jefferson IP Law, LLP

(57) ABSTRACT

A 5th generation (5G) or pre-5G communication system for supporting a data transmission rate higher than that of a 4th generation (4G) communication system, such as long term evolution (LTE) is provided. The wireless communication system, includes a plurality of antennas for identifying a plurality of radio signal, a receiver for receiving the plurality of the radio signals via the plurality of the antennas, wherein the receiver may include a coupler circuit for coupling the plurality of the received signals to different signal paths, to generate a first coupling signal by summing the plurality of the received signals and a second coupling signal corresponding to a difference of the plurality of the received signals, and a beam generator for generating a plurality of beamformed signals based on in-phase signals and quadrature-phase signals corresponding to the first coupling signal and the second coupling signal.

18 Claims, 15 Drawing Sheets

(58) Field of Classification Search
CPC ... H04B 5/0062; H04B 7/084; H04L 27/2082; H04L 27/3863; H01Q 3/267; G01S 13/48
See application file for complete search history.

(56) References Cited

U.S. PATENT DOCUMENTS

| | | | |
|---|---|---|---|
| 2007/0135167 A1* | 6/2007 | Liu | H04B 7/086 455/562.1 |
| 2008/0293451 A1* | 11/2008 | Haskell | H04B 7/0491 455/562.1 |
| 2010/0151810 A1* | 6/2010 | Grau Besoli | H04B 17/104 455/311 |
| 2019/0081693 A1* | 3/2019 | Eitan | H04B 7/086 |
| 2020/0195327 A1* | 6/2020 | Thiagarajan | H01Q 3/42 |
| 2020/0321987 A1* | 10/2020 | Hornbuckle | H04B 1/0014 |

FOREIGN PATENT DOCUMENTS

| | | |
|---|---|---|
| KR | 10-2009-0081753 A | 7/2009 |
| KR | 10-1857459 B1 | 5/2018 |
| KR | 10-2018-0095320 A | 8/2018 |
| KR | 10-2018-0105484 A | 9/2018 |
| WO | 2019/147048 A1 | 8/2019 |

OTHER PUBLICATIONS

Korean Office Action dated May 6, 2021, issued in Korean Application No. 10-2020-0036840.

* cited by examiner

METHOD AND APPARATUS FOR FORMING A PLURALITY OF BEAMFORMED SIGNALS USING A PLURALITY OF RECEIVED SIGNALS

CROSS-REFERENCE TO RELATED APPLICATION(S)

This application is based on and claims priority under 35 U.S.C. § 119(a) of a Korean patent application number 10-2019-0123851, filed on Oct. 7, 2019, in the Korean Intellectual Property Office and of a Korean patent application number 10-2020-0036840, filed on Mar. 26, 2020, in the Korean Intellectual Property Office, the disclosure of each of which is incorporated by reference herein in its entirety.

BACKGROUND

1. Field

The disclosure relates to a wireless communication system. More particularly, the disclosure relates to an apparatus and a method for generating a plurality of beamformed signals using a plurality of received signals in the wireless communication system.

2. Description of Related Art

Beamforming enhances signal intensity through superposition using a plurality of transducers in signal transmission and reception. As for the concept of transmit/receive beamforming using one-dimensional array transducers, one point from which image information is to be acquired is referred to as a focal point, and there is a difference in distance between each transducer and the focal point because the plurality of the transducers is aligned in a line. Accordingly, signals are transmitted from and reflected to the transducers at different times, and if the received signals are superposed, their phases mismatch and the signals may not be amplified. As a result, the beamforming requires to match the phases of the signals. The phases of the signals are matched by delaying the transmit and receive signals, and the beamforming may be classified depending on this delaying scheme. The beamforming may be divided into analog beamforming and digital beamforming. The analog beamforming delays a signal using a circuit device, and the digital beamforming delays a signal by digitalizing and storing the signal and then reading data after an intended time passes.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an apparatus and a method for generating a plurality of beamformed signals using a plurality of received signals in a wireless communication system.

Another aspect of the disclosure is to provide an apparatus and a method for forming more beams than a plurality of received signals in generating a plurality of beamformed signals using the plurality of the received signals in a wireless communication system.

Another aspect of the disclosure is to provide an apparatus and a method for generating a plurality of beamformed signals using a plurality of received signals and a phase shifter embedded in an in-phase (I)/quadrature-phase (Q) demodulator, without using a separate phase shifter, in a wireless communication system.

Another aspect of the disclosure is to provide an apparatus and a method for detecting a direction of a received signal by generating a plurality of beamformed signals using a plurality of received signals in a wireless communication system.

Another aspect of the disclosure is to provide an apparatus and a method for generating a plurality of beamformed signals in a low-power wireless communication system having difficulty in mounting a plurality of receivers.

Additional aspects will be set forth in part in the description which follows and, in part, will be apparent from the description, or may be learned by practice of the presented embodiments.

In accordance with an aspect of the disclosure, a communication apparatus is provided. The communication apparatus includes a plurality of antennas for identifying a plurality of radio signal, a receiver for receiving the plurality of the radio signals via the plurality of the antennas, wherein the receiver may include a coupler circuit for coupling the plurality of the received signals to different signal paths, to generate a first coupling signal by summing the plurality of the received signals and a second coupling signal corresponding to a difference of the plurality of the received signals, and a beam generator for generating a plurality of beamformed signals based on in-phase signals and quadrature-phase signals corresponding to the first coupling signal and the second coupling signal.

In accordance with another aspect of the disclosure, a method is provided. The method includes identifying, at a plurality of antennas, a plurality of radio signals, receiving signals via the antennas, generating a first coupling signal by summing the received signals, by coupling the received signals to different signal paths, generating a second coupling signal corresponding to a difference of the received signals, generating in-phase signals and quadrature-phase signals corresponding to the first coupling signal and the second coupling signal, and generating a plurality of beamformed signals based on the in-phase signals and the quadrature-phase signals.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components and structures.

DETAILED DESCRIPTION

Figure 1:
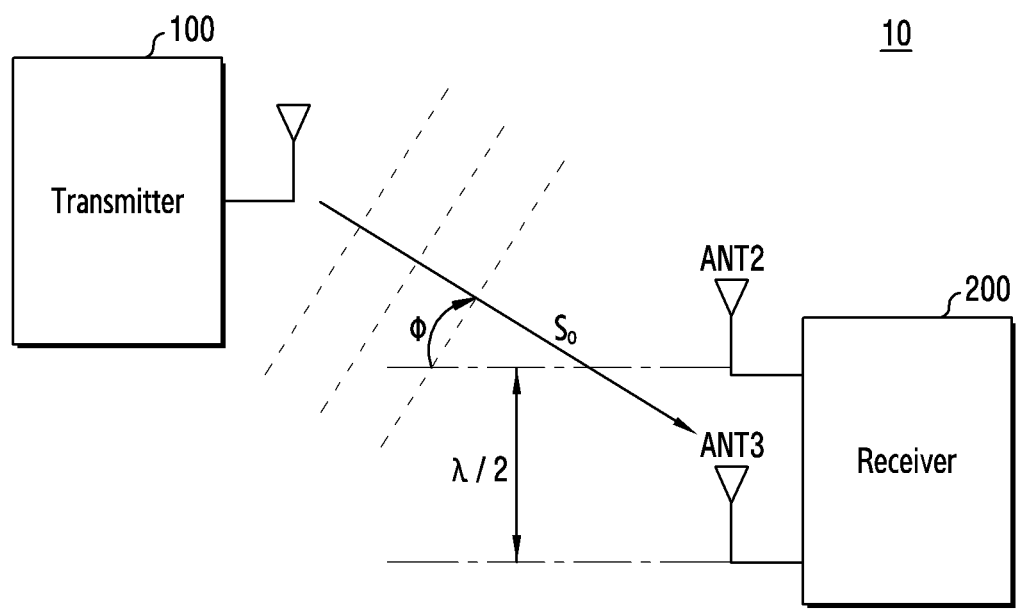
FIG. 1 illustrates a block diagram of a wireless communication system according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Various embodiments of the disclosure to be described below describes a hardware approach as an example. However, since the various embodiments of the disclosure include a technology using both hardware and software, various embodiments of the disclosure do not exclude a software-based approach.

There are various direction finding techniques but a monopulse direction finding technique is used most widely. The monopulse direction finding technique forms a left beam and a right beam based on a center axis of two antenna beams, and forms beams of a sum channel Σ by summing magnitude of the two beams and a delta channel Δ by subtracting the magnitude of the two beams. In a vertical direction to the antenna, the channel Σ has the maximum magnitude, whereas the channel Δ has the minimum value. The angle moves away from the center axis, the magnitude of the channel Σ decreases and the magnitude of the channel Δ increases. The magnitude of the channel Σ and the channel Δ may be easily implemented with a radio frequency (RF) circuit using a power combiner and a 180° hybrid. The monopulse direction finding technique features the simple configuration, but is subject to trade-off between accuracy of the direction finding and the detection angle. For example, increasing the accuracy of the direction finding narrows the detection angle, and increasing the detection angle lowers the accuracy of the direction finding. In addition, since the magnitude of the channel Σ and the channel Δ varies considerably according to an angle difference, digital implementation is sensitive to direction finding error. Hence, the monopulse direction finding scheme exhibits a narrow direction finding range using two adjacent beams of small beamwidths.

Hereafter, various embodiments provide an apparatus and a method for forming a plurality of beams using a plurality of received signals in a wireless communication system. Specifically, the disclosure explains a technique for forming a plurality of beams in a low-power wireless communication system including a small number of receivers.

In this disclosure, to determine whether a specific condition is satisfied or fulfilled, expressions, such as "greater than" or "less than" are used by way of example and expressions, such as "greater than or equal to" or "less than or equal to" are also applicable and not excluded. For example, a condition defined with "greater than or equal to" may be replaced by "greater than" (or vice-versa), and a condition defined with "less than or equal to" may be replaced by "less than" (or vice-versa), on the like.

FIG. 1 illustrates a block diagram of a wireless communication system according to an embodiment of the disclosure.

Referring to FIG. 1, a communication system 10 may include a set of communication devices, for example, a transmitter 100 and a receiver 200. A plurality of transmitters 100 and a plurality of receivers 200 may be included.

The transmitter 100 may include a first antenna ANT1 for radio signal transmission, and may transmit a radio signal $S_0$ to the receiver 200 via the first antenna ANT1.

According to various embodiments of the disclosure, the radio signal $S_0$ may be an RF signal. The receiver 200 may receive the radio signal from the transmitter 100 via a plurality of antennas ANT2 and ANT3.

According to various embodiments of the disclosure, the antennas ANT2 and ANT3 of the receiver 200 may be spaced by a distance corresponding to a half wavelength $\lambda/2$ of the radio signal $S_0$ to be received at the receiver 200.

By receiving the radio signal, the antennas ANT2 and ANT3 of the receiver 200 may receive a plurality of received signals having different phase differences.

An angle or arrival (AoA) $\Phi$ of the radio signal $S_0$ received at the receiver 200 may differ depending on a location of the transmitter 100, and the receiver 200 may generate a plurality of beamformed signals based on the varying AoA.

According to various embodiments of the disclosure, if the receiver 200 is implemented as a direction finder, the receiver 200 may detect a direction of the transmitter 100 based on the magnitude of the beamformed signals generated.

The disclosure is not limited to the antennas ANT1, ANT2, and ANT3, but may be applicable to a plurality of antennas, a plurality of transmitters 100, and a plurality of receivers 200.

According to various embodiments of the disclosure, more beamformed signals than the received signals and the receivers 200 in number may be generated.

Figure 2:
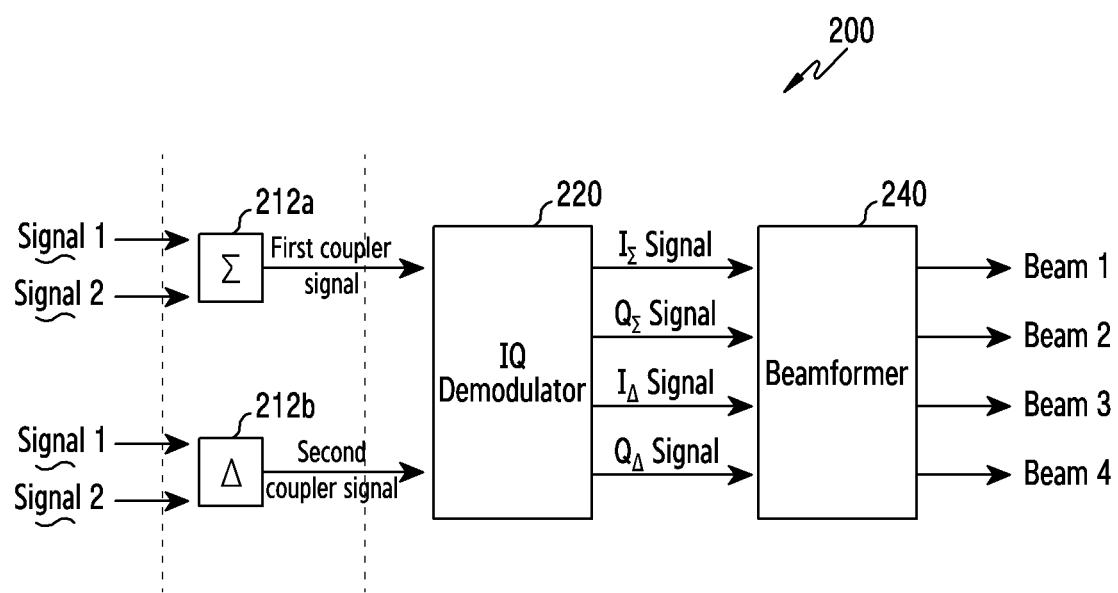
FIG. 2 illustrates a block diagram of a receiver of FIG. 1 according to an embodiment of the disclosure.

FIG. 2 illustrates a block diagram of a receiver of FIG. 1 according to an embodiment of the disclosure.

Referring to FIG. 2, a signal 1 and a signal 2 are added or subtracted to generate coupling signals. For example, a first coupling signal 212a is generated by summing the signal 1 and the signal 2, and a second coupling signal 212b is generated by subtracting the signal 1 and the signal 2.

The first coupling signal $\Sigma$ and the second coupling signal $\Delta$ each are inputted to an in-phase (I)/quadrature-phase (Q) demodulator to generate an I signal and a Q signal. For example, the first coupling signal generates the I signal $I_\Sigma$ and the Q signal $Q_\Sigma$, and the second coupling signal generates the I signal $I_\Delta$ and the Q signal $Q_\Delta$.

$I_\Sigma$, $Q_\Sigma$, $I_\Delta$ and $Q_\Delta$ are inputted to a beamformer 240 to generate a plurality of beamformed signals.

According to various embodiments of the disclosure, the number of the received signals and the number of the beamformed signals are not limited to those in the drawing. For example, according to various embodiments of the disclosure, if m-ary received signals are received, m/2-ary first coupling signals and m/2-ary second coupling signals may be generated and converted to I signals and Q signals to thus form 2m-ary beams (where m is a positive number greater than 1).

Figure 3:
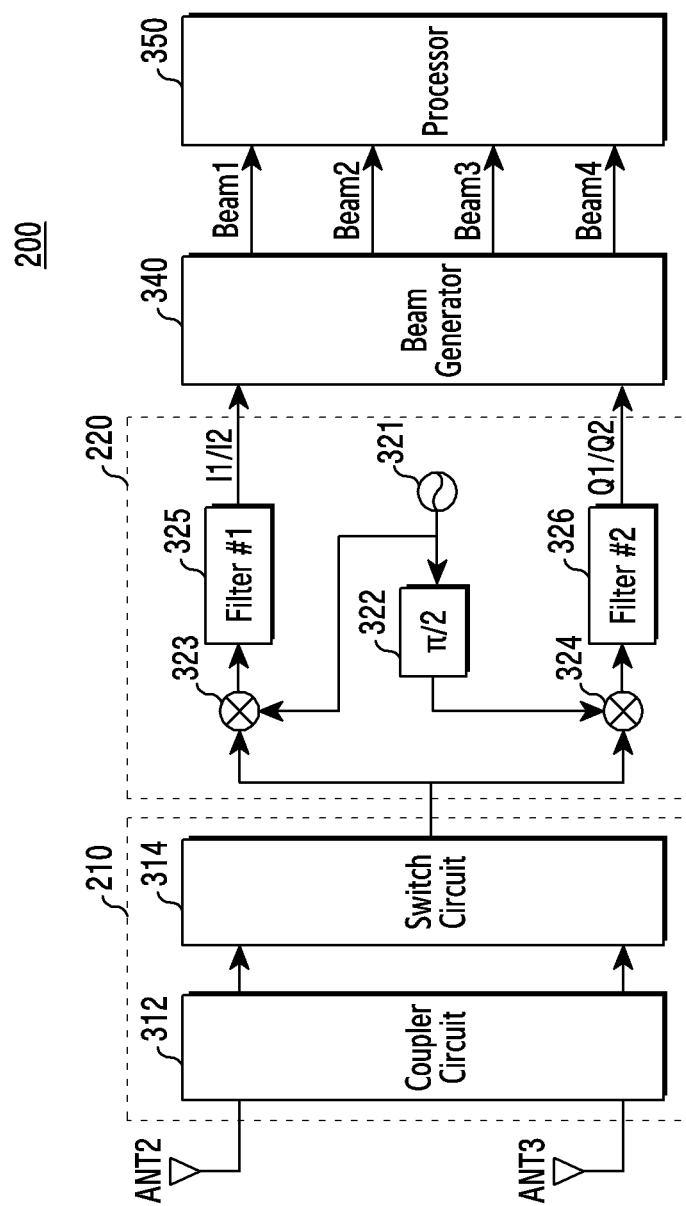
FIG. 3 illustrates a block diagram of a receiver of FIG. 2 according to an embodiment of the disclosure.

FIG. 3 illustrates a block diagram of a receiver of FIG. 2 according to an embodiment of the disclosure.

Referring to FIG. 3, a receiver 200 may include a plurality of antennas ANT2 and ANT3, an RF processor 210, a I/Q demodulator 220, a beam generator 340, and a processor 350.

The antennas ANT2 and ANT3 may receive aa plurality of radio signals and thus receive a plurality of received signals having different phase differences.

Now, the radio signals received via the antennas ANT2 and ANT3 are assumed based on Equation 1.

$$s(t)=As_0 \cos(\omega_0 t+\phi_0) \qquad \text{Equation 1}$$

In Equation 1, A denotes the amplitude of the transmit signal, $s_0$ denotes symbol data, $\omega_0$ denotes a frequency of the radio signal, and $\phi_0$ denotes an initial phase (assumed to be zero).

The received signals generated by the antennas ANT2 and ANT3 may be expressed as $r_0(t)$ and $r_0(t)e^{i\Delta\theta}$.

Assuming a far-field, the received signals become $r_0(t)$ and $r_0(t)e^{i\Delta\theta}$ through plane wave approximation. Herein, $\Delta\theta=(\lambda/2)\sin\varnothing$, and $\varnothing$ denotes an angle of the antenna of the transmitter 100 based on the center of the antennas ANT2 and ANT3.

The RF processor 210 may include a coupler circuit 312 and a switch circuit 314.

The I/Q demodulator 220 may include a local oscillator 321, a phase shifter 322, a first mixer 323 and a second mixer 324.

A local oscillator signal generated by the local oscillator 321 is fed directly to the first mixer 323, and the local oscillator signal having the phase difference of 90 degrees through the phase shifter 322 may be fed to the second mixer 324.

The first mixer 323 may convert a frequency band of the first coupling signal or the second coupling signal to a baseband, using the local oscillator signal fed from the local oscillator 321.

The second mixer 324 may convert the frequency band of the first coupling signal or the second coupling signal to a baseband, using the local oscillator signal from the local oscillator 321 with the phase difference of 90 degrees through the phase shifter 322.

According to various embodiments of the disclosure, the first mixer 323 and the second mixer 324 may be implemented as one mixer.

A first filer 325 may sequentially filter the first baseband signal and the second baseband signal from the first mixer 323, and sequentially output the filtered first baseband signal, that is, an in-phase signal I1 for the first baseband signal and the filtered second baseband signal, that is, an in-phase signal I2 for the second baseband signal.

A second filer 326 may sequentially filter the first baseband signal and the second baseband signal from the second mixer 324, and sequentially output the filtered first baseband signal, that is, a quadrature-phase signal Q1 for the first baseband signal and the filtered second baseband signal, that is, a quadrature-phase signal Q2 for the second baseband signal.

According to various embodiments of the disclosure, the first filter 325 and the second filter 326 each may be implemented with a low pass filter (LPF).

For example, the in-phase signal (e.g., $s_0+s_0 e^{j\theta}$) for the first baseband signal and the in-phase signal (e.g., $s_0-s_0 e^{j\theta}$) for the second baseband signal outputted from the first filter 325 may be given as Equation 2.

$$I(t) = \begin{cases} s_0 + s_0 e^{j\theta}, \text{ or} \\ s_0 - s_0 e^{j\theta} \end{cases} ; \qquad \text{Equation 2}$$

According to various embodiments of the disclosure, the second filter 326 may generate the quadrature-phase signal for the first baseband signal and then generate the quadrature-phase signal for the second baseband signal.

For example, the quadrature-phase signal (e.g., $j(s_0+s_0 e^{j\theta})$) for the first baseband signal and the quadrature-phase signal (e.g., $j(s_0-s_0 e^{j\theta})$) for the second baseband signal which are generated by the second filter 326 may be expressed as Equation 3.

$$Q(t) = \begin{cases} j(s_0 + s_0 e^{j\theta}), \text{ or} \\ j(s_0 - s_0 e^{j\theta}) \end{cases} ; \quad \text{Equation 3}$$

The beam generator 340 may generate a plurality of beamformed signals Beam1 through Beam4 based on the in-phase signals I1 and I2 and the quadrature-phase signals Q1 and Q2 of the first baseband signal and the second baseband signal outputted from the first filter 325 and the second filter 326 respectively.

According to an embodiment of the disclosure, the beamformed signals Beam1 through Beam4 may be expressed as Equation 4.

$$\begin{bmatrix} 1, -1 \\ 1, -j \\ 1, 1 \\ 1, j \end{bmatrix} = \begin{bmatrix} s_0 - s_0 e^{j\theta} \\ s_0 - js_0 e^{j\theta} \\ s_0 + s_0 e^{j\theta} \\ s_0 + js_0 e^{j\theta} \end{bmatrix} = \begin{bmatrix} I_\Delta \\ (I_\Sigma + I_\Delta)/2 + (Q_\Sigma - Q_\Delta)/2 \\ I_+ \\ (I_\Sigma - I_\Delta)/2 + (Q_\Sigma + Q_\Delta)2 \end{bmatrix} \quad \text{Equation 4}$$

In Equation 4, $I_\Delta$ may be $s_0-s_0 e^{j\theta}$, $I_\Sigma$ may be $s_0+s_0 e^{j\theta}$, $Q_\Delta$ may be $j(s_0+s_0 e^{j\theta})$, and $Q_\Sigma$ may be $j(s_0-s_0 e^{j\theta})$.

In Equation 4, the beamformed signal (1, −1) of the first row may correspond to a case where the outputs of the two antennas ANT2 and ANT3 are added as the difference Δ at the coupler circuit 312, that is, the phases of the two antennas ANT2 and ANT3 are (0 degree, 180 degrees).

In Equation 4, the beamformed signal (1, −j) of the second row may correspond to a case where the phases of the two antennas ANT2 and ANT3 are (0 degree, −90 degrees).

In Equation 4, the beamformed signal (1,1) of the third row may correspond to a case where the outputs of the two antennas ANT2 and ANT3 are summed Σ in phase, that is, the phases of the two antennas ANT2 and ANT3 are (0 degree, 0 degree).

In Equation 4, the beamformed signal (1,j) of the fourth row may correspond to a case where the phases of the two antennas ANT2 and ANT3 are (0 degree, 90 degrees).

Based on the magnitudes of the beamformed signals Beam1 through Beam4 generated by the beam generator 340, the processor 350 may determine an incidence angle of the radio signal, and determine the direction of the transmitter 100 based on the determined incidence angle.

Figure 4:
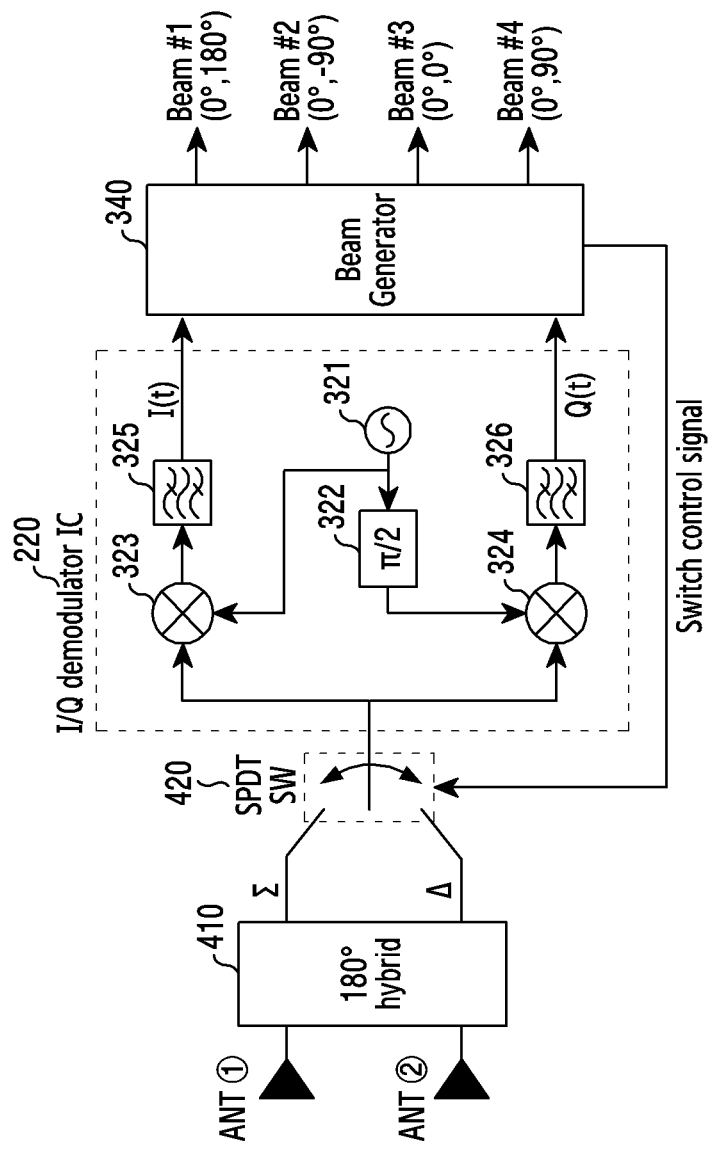
FIG. 4 illustrates a block diagram of a receiver of FIG. 3 according to an embodiment of the disclosure.

FIG. 4 illustrates a block diagram of a receiver of FIG. 3 according to an embodiment of the disclosure.

A single-channel direction finding system of the related art having an element antenna implements the RF beamforming using four digital phase shifters by use of a switch and a delay line. In this case, if the frequency falls below several gigahertz (GHz), the size of the phase shifter increases, which is hard to implement. Alternatively, a radio frequency integrated circuit (RFIC) may be designed using a lumped element, but its power consumption and price increase. In particular, it is not easy to implement a 180° phase shifter because of its considerable size. In addition, since one beamformed signal is generated at a time, four switch controls in total are required To overcomplex such shortcomings, various embodiments of the disclosure are shown in FIG. 4.

Referring to FIG. 4, various embodiments of the disclosure may achieve the phase 0° and the phase 180° by adding merely a 180° hybrid coupler 410 as the coupler circuit and a single pole double throw (SPDT) switch 420 as the switch circuit 314 to the coupler circuit 312 of the RF processor 210, without a separate phase shifter, and achieve the phase difference±90° by coupling the embedded 90° phase shifter 323 to the I/Q demodulator 220. Since a recent digital communication receiver mostly adopts a direct conversion I/Q demodulator, which includes therein the 90° phase shifter to generate the I signal which is the in-phase component and the Q signal having the phase difference 90° from the I signal, it is reused.

Figure 5:
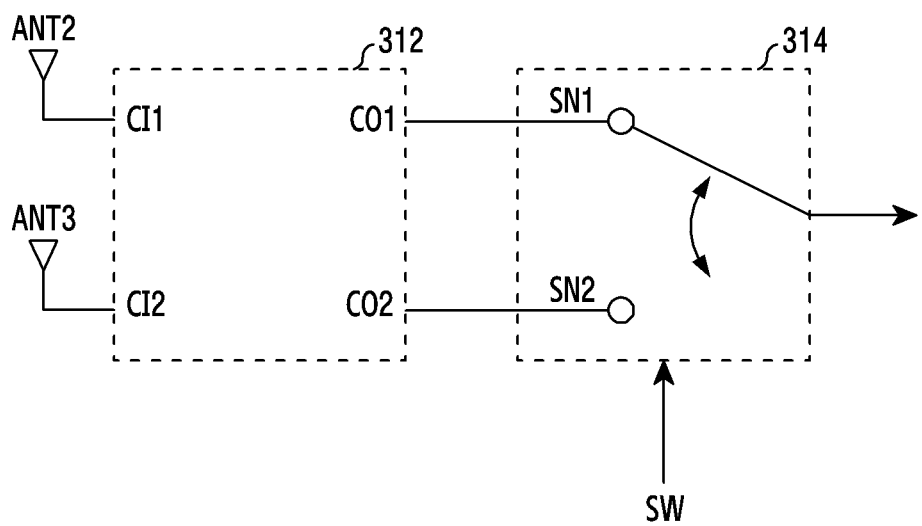
FIG. 5 illustrates a block diagram of a radio frequency (RF) processor of FIG. 3 in a wireless communication system according to an embodiment of the disclosure.

FIG. 5 illustrates a block diagram of an RF processor of FIG. 3 in a wireless communication system according to an embodiment of the disclosure.

Referring to FIG. 5, a coupler circuit 312 may include a first coupling input port CI1 for receiving a received signal via a second antenna ANT2 and a second coupling input port CI2 for receiving a received signal via a he third antenna ANT3.

The coupler circuit 312 may generate a plurality of coupling signals by coupling the received signal inputted to the first coupling port CI1 and the received signal inputted to the second coupling port CI2 to different signal paths.

The coupler circuit 312 may output the generated coupling signals through a first coupling output port CO1 and a second coupling output port CO2.

According to various embodiments of the disclosure, the coupler circuit 312 may output through the first coupling output port CO1, a first coupling signal by adding the received signals inputted through the first coupling input port CI1 and the second coupling input port CI2 along the first signal path, and may output through the second coupling output port CO2, a second coupling signal corresponding to (i.e., added in antiphase) the difference of the received signals through the second signal path.

For example, the first signal path may be coupled via the same-distance path to couple the plurality of the received signals in phase. For example, the second signal path may couple the paths of different distances to couple the plurality of the received signals in antiphase (i.e., to cause the phase difference of 180°).

According to various embodiments of the disclosure, the output of the coupler circuit 312 may be expressed as Equation 5.

$$y(t) = \begin{cases} r(t) + r(t)e^{j\theta}, \text{ or} \\ r(t) - r(t)e^{j\theta} \end{cases} ; \quad \text{Equation 5}$$

In this case, the first coupling signal (e.g., the added signal of the received signals, $r(t)+r(t)e^{j\theta}$) and the second coupling signal (e.g., the signal corresponding to the difference of the received signals, $r(t)-r(t)e^{j\theta}$) of Equation 5 may be outputted to the first coupling output port CO1 and the second coupling output port CO2 of the coupler circuit 312 respectively.

According to various embodiments of the disclosure, the coupler circuit 312 may include a 180° hybrid coupler, wherein the 180° hybrid coupler may invert the phase of at least one received signal in generating the second coupling signal.

The switch circuit 314 may selectively switch the output of the coupler circuit 312.

According to various embodiments of the disclosure, the switch circuit 314 may switch the signal path between a first switching node SN1 and a second switching node SN2 based on an external control signal SW.

According to various embodiments of the disclosure, the switch circuit 314 may switch the signal path between the first switching node SN1 and the second switching node SN2 on the symbol basis of the inputted signal.

According to various embodiments of the disclosure, the external control signal SW may be generated by, but not limited to, the processor 250.

For example, if the switch of the switch circuit 314 is connected to the first switching node SN1, the switch circuit 314 may output the first coupling signal from the first coupling output port CO1 of the coupler circuit 312 to the I/Q demodulator 220.

According to various embodiments of the disclosure, the signal outputted from the switch circuit 314 may be divided to two signal paths and fed to the I/Q demodulator 220.

According to various embodiments of the disclosure, the switch circuit 314 may be implemented with an SPDT.

Figure 6:
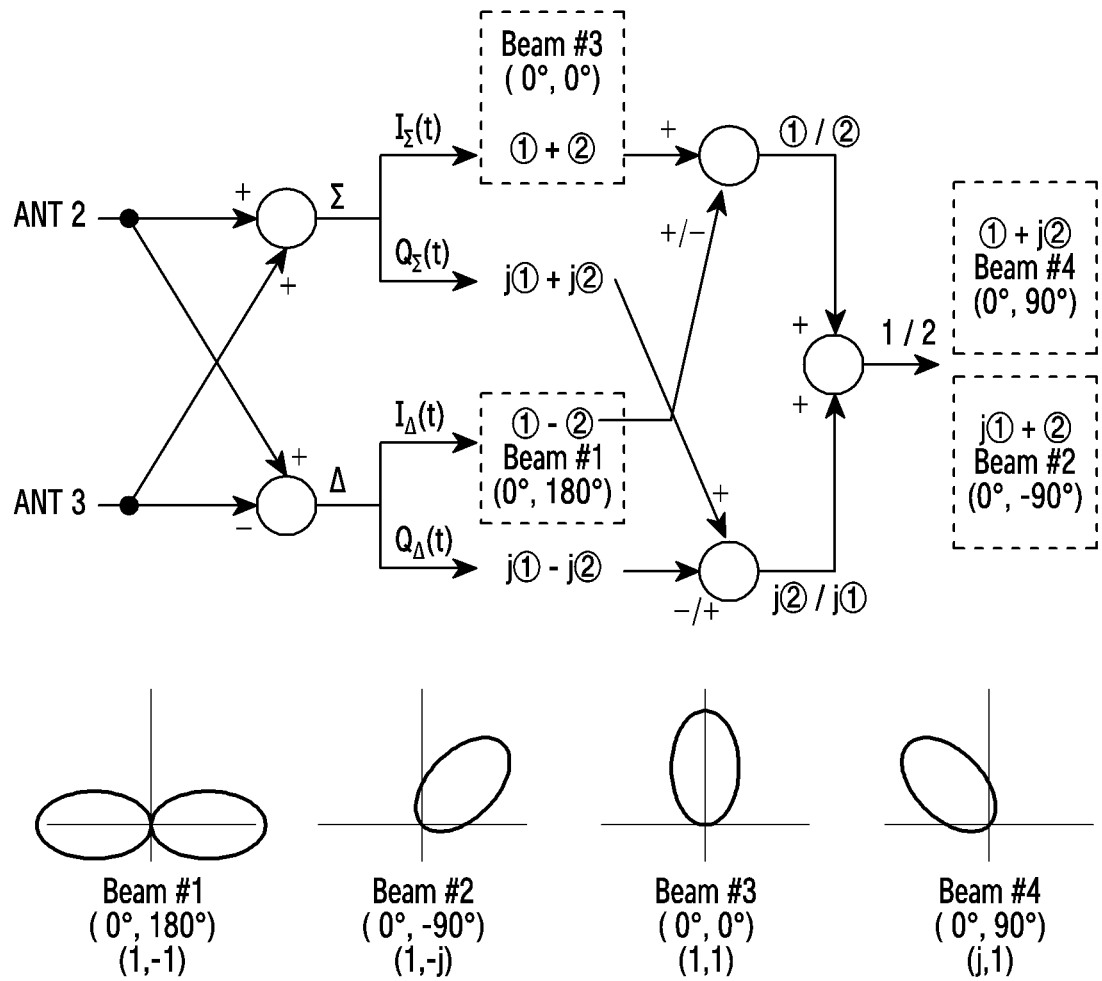
FIG. 6 illustrates radio signal processing in a receiver of FIG. 1 in a wireless communication system according to an embodiment of the disclosure.

FIG. 6 illustrates radio signal processing in a receiver of FIG. 1 in a wireless communication system according to an embodiment of the disclosure.

Referring to FIG. 6, the main processing of the radio signal in the receiver 200 may receive radio signals via the antennas ANT2 and ANT3 and thus receive a plurality of received signals having a phase difference.

The generated received signals may be coupled to different signal paths to generate a first coupling signal Σ by adding the received signals and a second coupling signal Δ corresponding to the difference of the received signals.

According to various embodiments of the disclosure, in generating the second coupling signal Δ, at least one received signal may be inverted in phase through the 180° hybrid coupler and coupled with other received signal.

The first coupling signal Σ may be I/Q-demodulated to generate the in-phase signal $I_Σ(t)$ and the quadrature-phase signal $Q_Σ(t)$ corresponding to the first coupling signal Σ.

The second coupling signal Δ may be I/Q-demodulated to generate the in-phase signal $I_Δ(t)$ and the quadrature-phase signal $Q_Δ(t)$ corresponding to the second coupling signal Δ.

According to various embodiments of the disclosure, frequency conversion may be further included before demodulating the first coupling signal Σ and the second coupling signal Δ.

The in-phase signal $I_Σ(t)$ corresponding to the first coupling signal Σ may be used as a third beamformed signal Beam #3, and the in-phase signal $I_Δ(t)$ corresponding to the second coupling signal Δ may be used as a first beamformed signal Beam #1.

Adding and calculation the value corresponding to the difference are sequentially performed on the in-phase signal $I_Σ(t)$ corresponding to the first coupling signal Σ and the in-phase signal $I_Δ(t)$ corresponding to the second coupling signal Δ, and first outputs ①/② may be output in sequence.

Calculation the value corresponding to the difference and adding are sequentially performed on the quadrature-phase signal $Q_Σ(t)$ corresponding to the first coupling signal Σ and the quadrature-phase signal $Q_Δ(t)$ corresponding to the second coupling signal Δ, and second outputs j①/j② may be output in sequence.

The receiver 200 may generate a second beamformed signal Beam #2 and a fourth beamformed signal Beam #4 by combining the first output ① or ② and the second output j① or j②.

According to an embodiment of the disclosure, combining the first output ① or ② and the second output j① or j② may include outputting a ½ value of the sum of the first output ① or ② and the second output j① or j②.

The receiver 200 may generate the four beamformed signals Beam #1 through Beam #4 as shown in FIG. 6.

Figure 7:
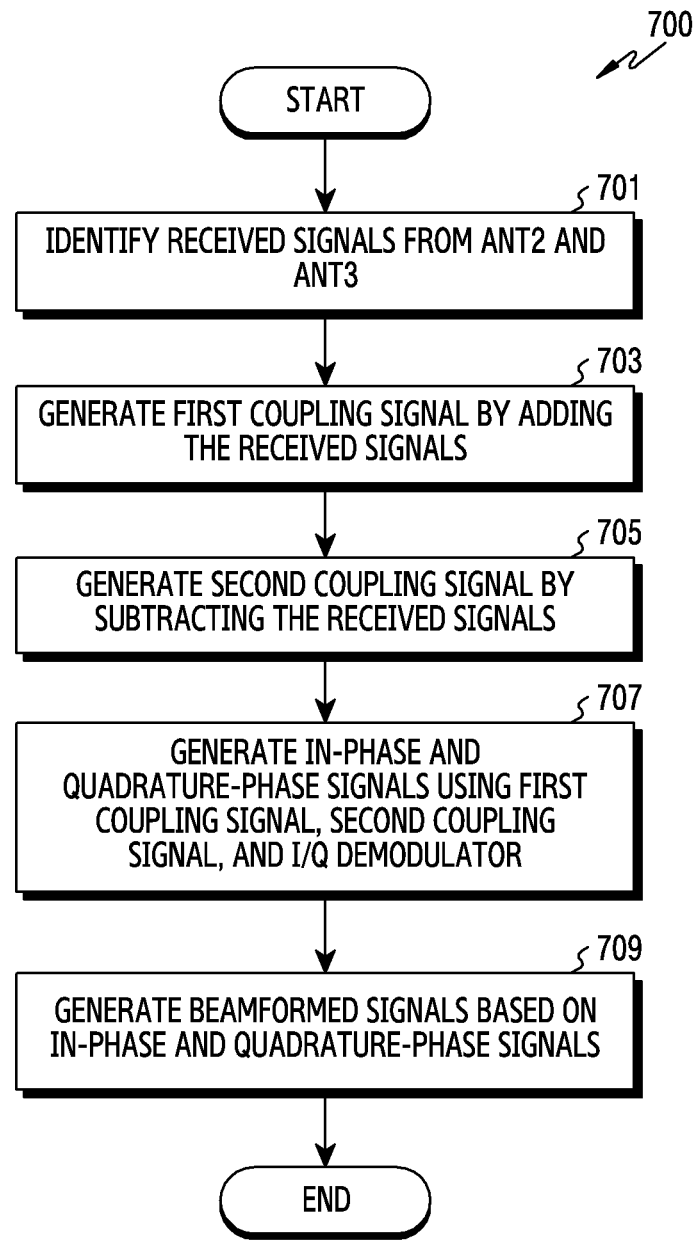
FIG. 7 illustrates a flowchart of a method for generating a plurality of beamformed signals using a plurality of received signals in a wireless communication system according to an embodiment of the disclosure.

FIG. 7 illustrates a flowchart 700 of a method for generating a plurality of beamformed signals using a plurality of received signals in a wireless communication system according to an embodiment of the disclosure.

Referring to FIG. 7, the method for generating the plurality of the beamformed signals using the plurality of the received signals in the wireless communication system includes identifying the received signals from ANT2 and ANT3 in operation 701, generating a first coupling signal 703 by adding the received signals of operation 701, generating a second coupling signal 705 by subtracting the received signals of operation 701, generating in-phase signals $I_Σ$ and $I_Δ$ and quadrature-phase signals $Q_Σ$ and $Q_Δ$ by I/Q-demodulating the first coupling signal and the second coupling signal in operation 707, and generating the plurality of the beamformed signals in operation 709 based on the in-phase signals and the quadrature-phase signals of operation 707.

The receiver 200 according to various embodiments of the disclosure may receive radio signals and thus receive and identify the plurality of the received signals having the phase difference in operation 701.

For example, the receiver 200 may receive the radio signals via a plurality of antennas ANT2 and ANT3, and the antennas ANT2 and ANT3 may receive the received signals having the phase difference respectively.

The receiver 200 may generate the plurality of the coupling signals in operations 703 and 705, by coupling the generated received signals to different signal paths.

According to various embodiments of the disclosure, the receiver 200 may add the received signals through a first signal path, and thus generate and output the first coupling signal.

According to various embodiments of the disclosure, the receiver 200 may generate and output the second coupling signal corresponding to the difference of the received signals through a second signal path.

The receiver 200 may generate the in-phase signal and the quadrature-phase signal corresponding to each coupling signal generated in operations 703 and 705, and generate a plurality of beams based on the generated in-phase signal and quadrature-phase signal in operation 707.

According to an embodiment of the disclosure, after converting the frequency band of the coupling signals, the receiver 200 may generate the in-phase signal and the quadrature-phase signal corresponding to the coupling signals (e.g., baseband signals) of the converted frequency band.

Figure 8:
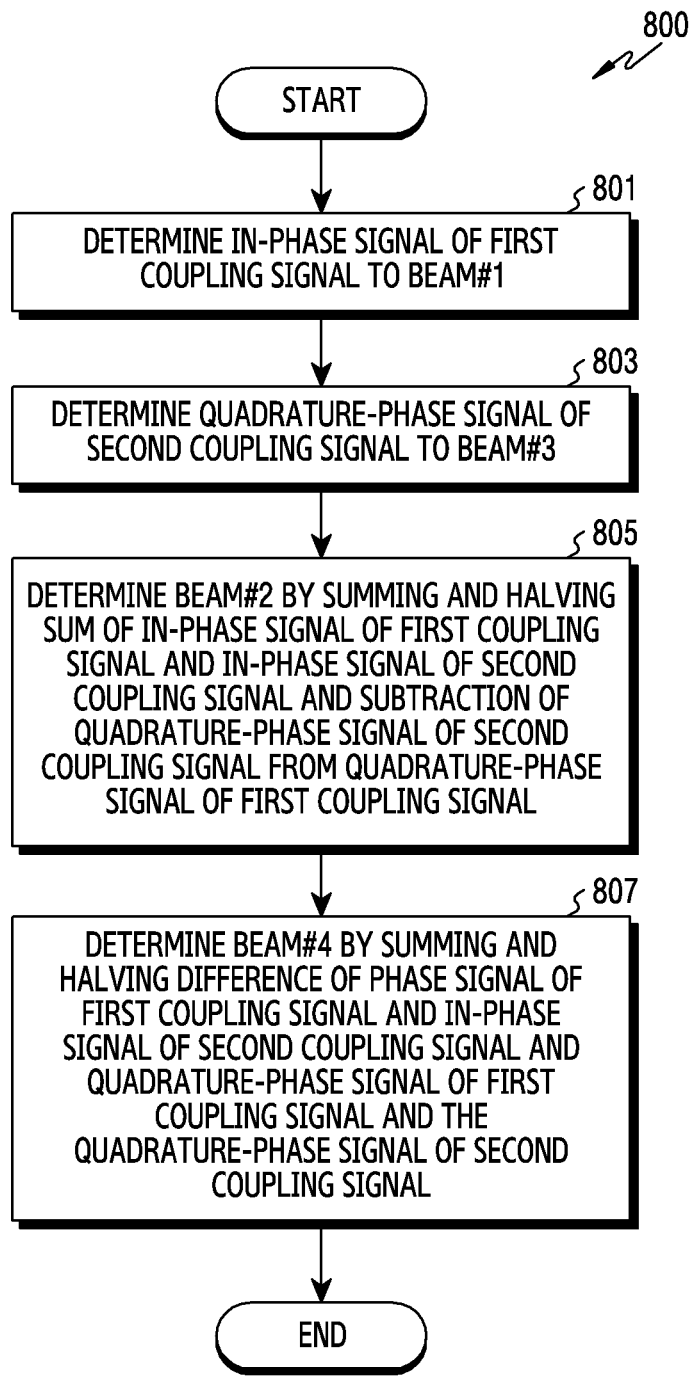
FIG. 8 illustrates a flowchart of a method for generating a plurality of beamformed signals using a plurality of in-phase (I) signals and quadrature-phase (Q) signals in a wireless communication system according to an embodiment of the disclosure.

FIG. 8 illustrates a flowchart 800 of a method for generating a plurality of beamformed signals using a plurality of in-phase signals and quadrature-phase signals in a wireless communication system according to an embodiment of the disclosure.

Referring to FIG. 8, the method for generating the plurality of the beams using the plurality of the in-phase signals and the quadrature-phase signals includes determining an in-phase signal of a first coupling signal to Beam #1 in operation 801, determining a quadrature-phase signal of a second coupling signal to Beam #3 in operation 803, determining Beam #2 in operation 805 by adding a signal acquired by lagging the difference of the quadrature-phase signal of the first coupling signal and the quadrature-phase signal of the second coupling signal by 90° and halving the magnitude and a signal acquired by halving the sum of the quadrature-phase signal of the first coupling signal and the quadrature-phase signal of the second coupling signal, and determining Beam #4 in operation 807 by adding a signal acquired by halving the sum of the in-phase signal of the first coupling signal and the in-phase signal of the second coupling signal and a signal acquired by lagging the difference of the in-phase signal of the first coupling signal and the in-phase signal of the second coupling signal by 90° and halving the magnitude.

The above process may be expressed as Equation 6 through Equation 9.

$$\text{Beam #1} = I_\Delta \quad \text{Equation 6}$$

$$\text{Beam #2} = \tfrac{1}{2}((I_\Sigma + I_\Delta) + (Q_\Sigma - Q_\Delta)) \quad \text{Equation 7}$$

$$\text{Beam #3} = I_\Sigma \quad \text{Equation 8}$$

$$\text{Beam #4} = \tfrac{1}{2}((I_\Sigma - I_\Delta) + (Q_\Delta + Q_\Sigma)) \quad \text{Equation 9}$$

The first beamformed signal is (1, −1), which corresponds to a case where the outputs of the two antennas are added as the difference Δ and the phase (0°, 180°) is added to each antenna. The third beamformed signal is (1,1), which corresponds to a case where the outputs of the two antennas are added Σ in phase and the antenna outputs are added directly. The second beamformed signal acquires $2S_0$ by adding the first equation and the second equation of Equation 4, acquires $j2S_0 e^{j\theta}$ by subtracting the two equations of Equation 5, applies the subtraction to the two equations, and then divided by 2, wherein the phase (0°, −90°) is added to the output of the two antennas. The fourth beamformed signal acquires $2S_0$ by adding the first equation and the second equation of Equation 4, acquires $j2S_0 e^{j\theta}$ by subtracting the two equations of Equation 5, and adds and divides the two equations by two, wherein the phase (0°, 90°) is added to the output of the two antennas. Hence, the disclosure virtually calculates the variation of the magnitude corresponding to the four beams according to the incidence angle by adjusting the switch in the middle of the symbol period just once.

The magnitude variation of the beam for the three incidence angles 0°, 30°, and −30° of the received signal is shown in Table 1. In response to the incidence angle 0°, the SUM beam of the beam vector (0°, 0°) exhibits the maximum value, whereas the beam (0°, 90°) and the beam (0°, −90°) are halved in magnitude. By contrast, the beam (0°, 90°) exhibits the maximum value in response to the incidence angle 30°, and the beam (0°, −90°) exhibits the maximum value in response to the incidence angle −30°. As such, the suggested method may easily generate the four beamformed signals with the 2-element antenna without a complicated phase shifter.

TABLE 1

Table 1 Size of each beam according to the angle of incidence

| The angle of incidence [degree] | Phase difference θ [rad] | Beam #3 (0°, 0°) | Beam #1 (0°, 180°) | Beam #4 (0°, 90°) | Beam #2 (90°, 0°) |
|---|---|---|---|---|---|
| 0 | 0 | $s_o$ | 0 | $s_o/2$ | $s_o/2$ |
| 30 | π/2 | $s_o/2$ | $s_o/2$ | $s_o$ | 0 |
| −30 | −π/2 | $s_o/2$ | $s_o/2$ | 0 | $s_o$ |

Notably, the number of the beams is not limited four, and the magnitude variation of more beams than the received signals may be acquired using a plurality of receivers and a plurality of I/Q demodulators.

Figure 9:
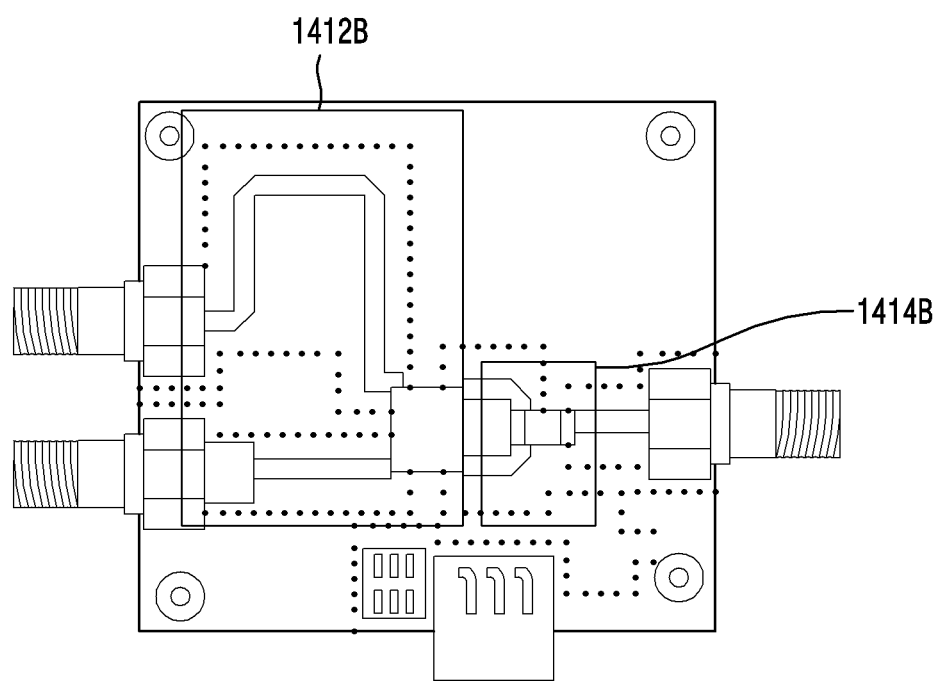
FIG. 9 illustrates an RF processor of FIG. 5 in a wireless communication system according to an embodiment of the disclosure.

FIG. 9 illustrates an RF processor of FIG. 5 in a wireless communication system according to an embodiment of the disclosure.

For example, according to various embodiments of the disclosure, if m-ary received signals are received, m/2-ary first coupling signals and m/2-ary second coupling signals may be generated and converted to in-phase signals and quadrature-phase signals, to thus generate 2m-ary beams (where m is a positive number greater than 1).

Figure 10:
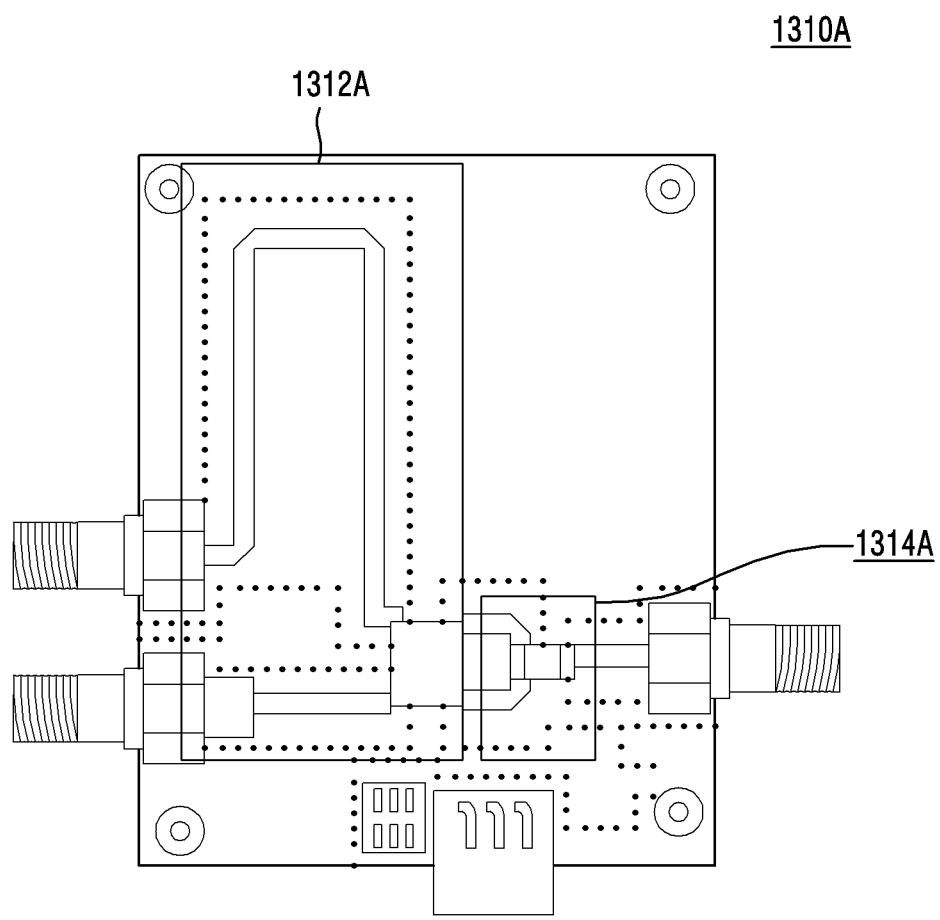
FIG. 10 illustrates an RF processor of FIG. 5 in a wireless communication system according to an embodiment of the disclosure.

FIG. 10 illustrates an RF processor of FIG. 5 in a wireless communication system according to an embodiment of the disclosure.

Referring to FIG. 9, the coupler circuit 312 and the switch circuit 314 may be implemented as a coupler circuit 1412b and a switch circuit 1414b of FIG. 9 in the frequency band having the center frequency of 920 megahertz (MHz).

Referring to FIG. 10, the coupler circuit 312 and the switch circuit 314 of 1310A may be implemented as a coupler circuit 1312a and a switch circuit 1314a of FIG. 10 in the frequency band having the center frequency of 2.4 GHz.

Figure 11:
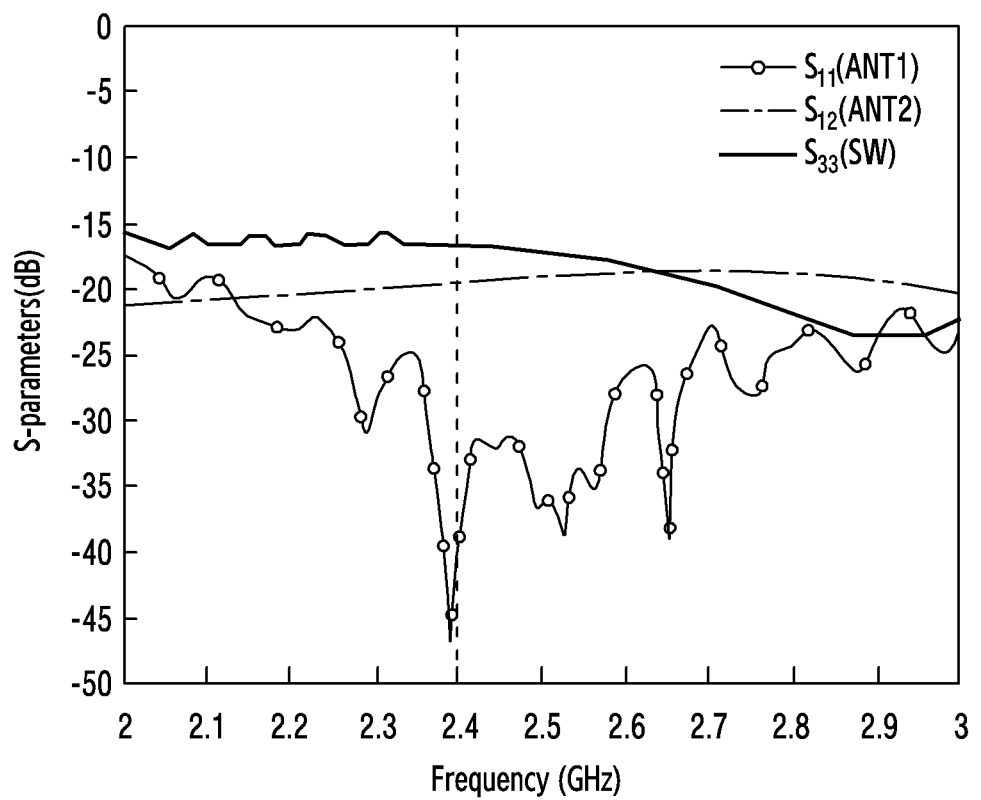
FIG. 11 illustrates a graph of return loss per frequency band of an RF processor of FIG. 9 in a wireless communication system according to an embodiment of the disclosure.

FIG. 11 illustrates a graph of return loss per frequency band of an RF processor of FIG. 9 in a wireless communication system according to an embodiment of the disclosure.

Figure 12:
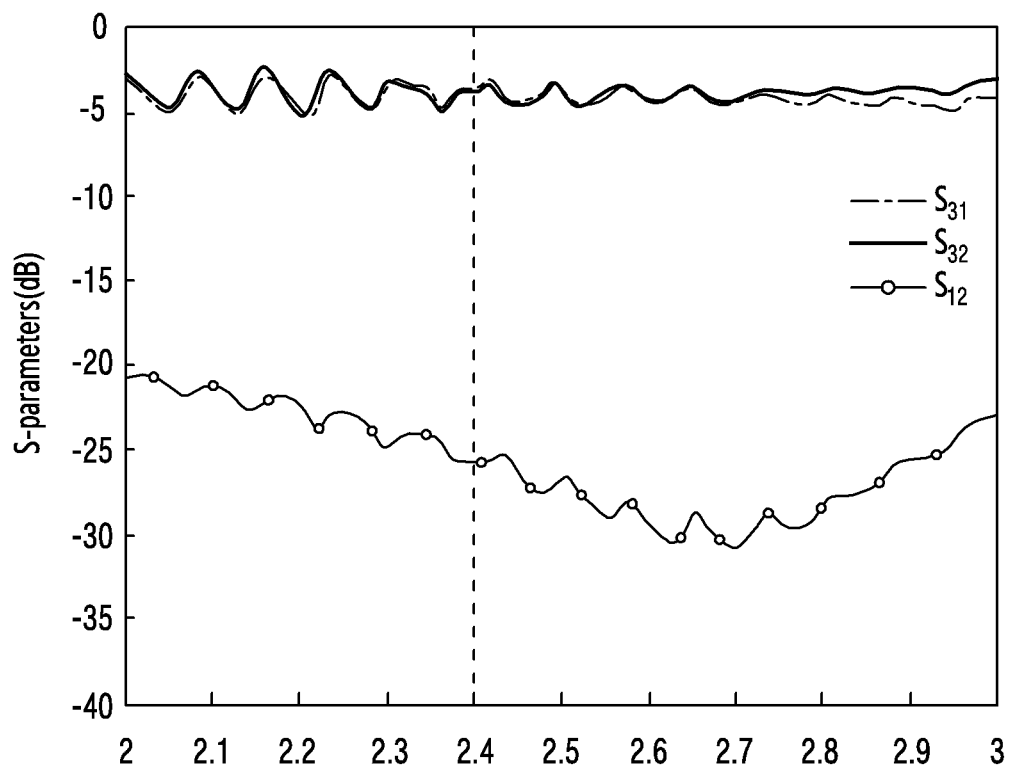
FIG. 12 illustrates a graph of isolation per frequency band of an RF processor of FIG. 9 in a wireless communication system according to an embodiment of the disclosure.

FIG. 12 illustrates a graph of isolation per frequency band of an RF processor of FIG. 9 in a wireless communication system according to an embodiment of the disclosure.

Figure 13:
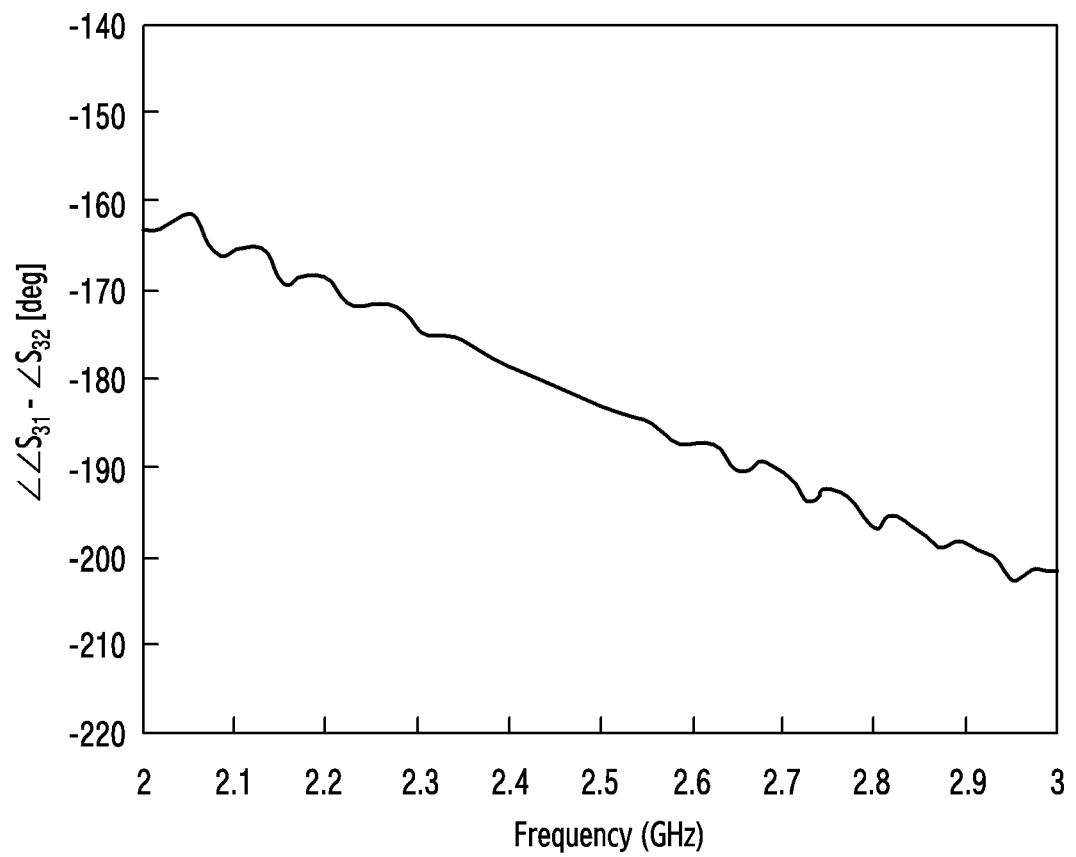
FIG. 13 illustrates a graph of phase difference per frequency band of antennas of FIG. 9 in a wireless communication system according to an embodiment of the disclosure.

FIG. 13 illustrates a graph of phase difference per frequency band of an RF processor of FIG. 9 in a wireless communication system according to an embodiment of the disclosure.

FIGS. 11, 12, and 13 depict the graphs of the return loss, the isolation, and the phase difference of the RF processor 210b of FIG. 9 designed to operate in the frequency band having the center frequency of 2.4 GHz.

Referring to FIGS. 11, 12, and 13, low return loss is exhibited at the 2.4 GHz, and the phase difference of 180° between the two antennas is identified.

Figure 14:
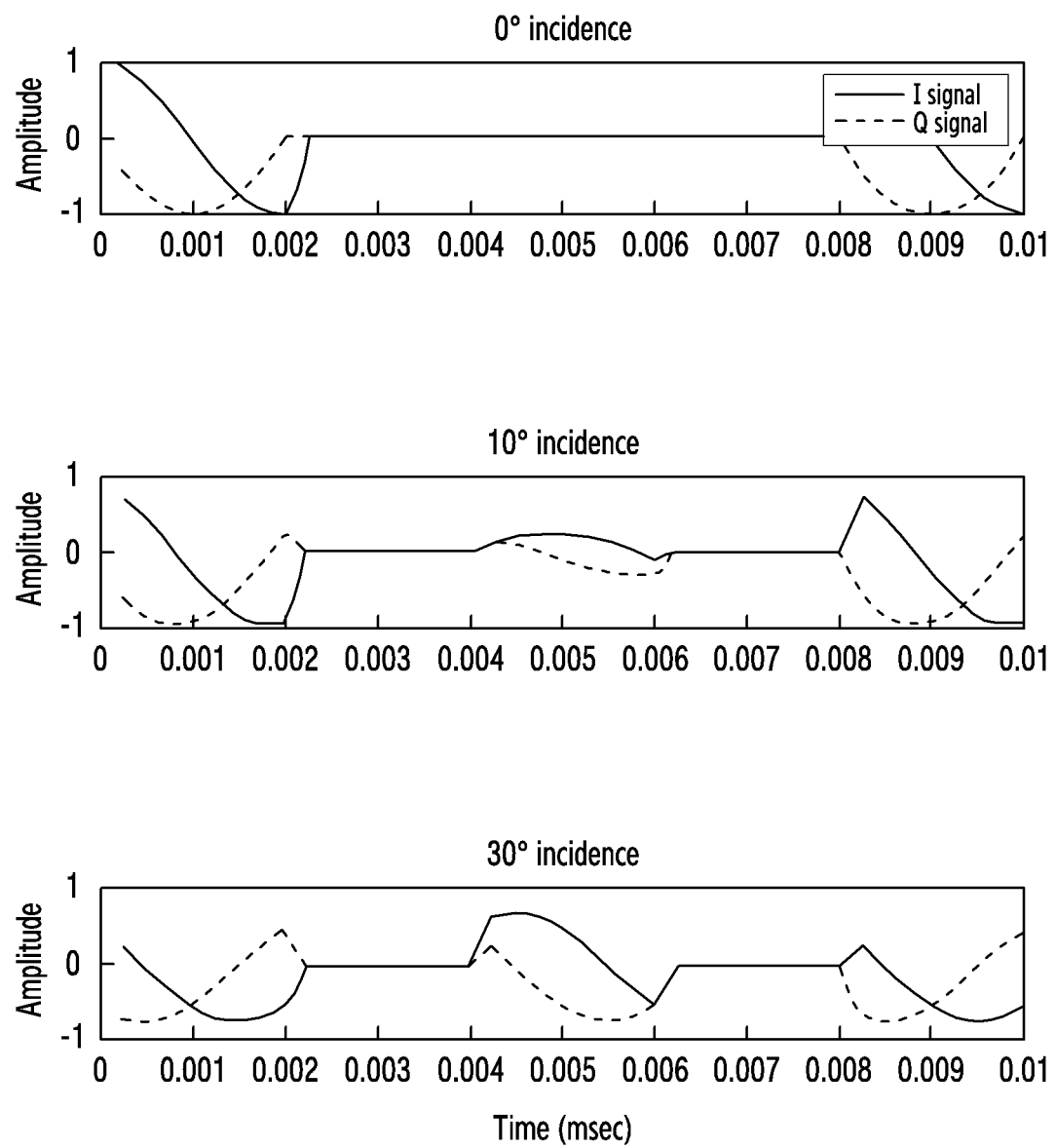
FIG. 14 illustrates a graph of variation of an I signal and a Q signal generated at a receiver of FIG. 1 according to an incidence angle of a radio signal in a wireless communication system according to an embodiment of the disclosure.

FIG. 14 illustrates a graph of variation of an I signal and a Q signal generated at a receiver of FIG. 1 according to an incidence angle of a radio signal in a wireless communication system according to an embodiment of the disclosure.

Referring to FIG. 1 through FIG. 14, various embodiments of the disclosure may operate according to Bluetooth (e.g., Bluetooth 5.1) standard.

The in-phase (I) signal and the quadrature-phase (Q) signal vary if the incidence angle of the radio signal is 0°, 10°, and 30° based on a plane vertical to the antenna ANT2 and ANT3.

FIG. 14 shows signal waveform variation for 10 microsec, and the signal output and the switch period may be set at the interval of 2 microsec according to the Bluetooth standard. Initial 2 microsec may output the sum signal, and 4 microsec to 6 microsec may output the difference signal. The difference signal is 0 if the incidence angle of the radio signal is 0°, and the magnitude of the difference signal increases as the incidence angle increases.

Figure 15:
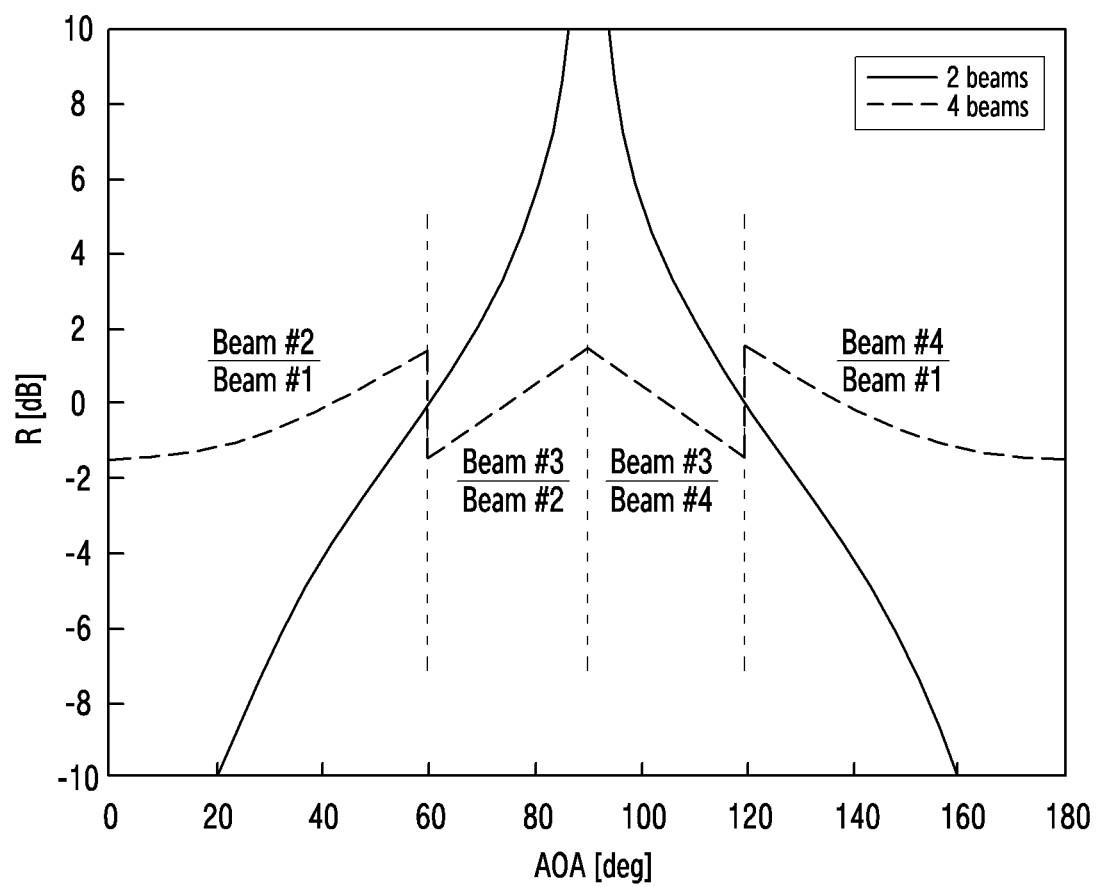
FIG. 15 illustrates a graph for comparing direction finding performance of a receiver of FIG. 1 with a monopulse receiver according to an incidence angle of a radio signal in a wireless communication system according to an embodiment of the disclosure.

FIG. 15 illustrates a graph for comparing direction finding performance of a receiver of FIG. 1 with a monopulse receiver according to an incidence angle of a radio signal in a wireless communication system according to an embodiment of the disclosure.

The monopulse direction finding system of the related art, which uses merely the sum and the difference of two antennas, is simple in structure but exhibits unsatisfactory direction finding performance.

The direction finding technique using the plurality of the beamformed signals according to various embodiments of the disclosure has been used mostly in military or radio surveillance, but is recently used in 5G mobile communication and wireless local area network (LAN). Further, a low-power internet of things (IoT) system, such as Bluetooth recently adopts the direction finding technique for a location-based service.

The array antenna based direction finding system of the related art may be divided into generating the beamformed signal at a digital end and generating the beam signal at an RF end, and the number of the beamformed signals generated in both schemes at the same time is equal to the number of the receivers. Accordingly, with only one receiver for low-power application, the RF beamforming scheme generates a plurality of beamformed signals using a phase shifter or an RF circuit, such as a Butler matrix and then sequentially connects them to the receiver using a switch. However, since the RF beamforming circuit is a function of the wavelength, it is difficult to use it because the circuit size increases under several GHz and its performance is degraded if a target moves fast because the beams are sequentially generated based on time.

Hence, if the direction finding technique is applied to the low-power system, such as Bluetooth, a research is attempted to implement a beamforming circuit using a simple RF switch. For example, a time modulated array (TMA) scheme generates a harmonic beamformed signal by adjusting ON/OFF time of the RF switch, or an on-off analog beam forming (OABF) scheme selectively turns on/off the antenna. However, with only two antennas, only two beamformed signals are generated and accordingly the direction finding performance is limited.

Referring to FIG. 15, an example of the disclosure provides a method for generating four beamformed signals in a direction finding system including two antennas and one receiver. The disclosure organizes the sum/difference pattern of the 2-element monopulse antenna and orthogonality of the I/Q demodulator typically used in a direction conversion wireless communication receiver. Based on that the I/Q demodulator outputs two signals I and Q having the phase difference 90°, the disclosure achieves four phase differences −90°, 0°, 90° and 180° between two antennas by coupling the I/Q demodulator to the 180° hybrid and the RF switch. The disclosure may not only generate the four beamformed signals through one switch control, but also provide low-power IoT wireless communication application requiring low-cost direction finding system implementation, with simple hardware.

According to various embodiments of the disclosure, the direction finding performance may be calculated based on Equation 10.

$$R = 10\log\frac{|I_\Sigma + jQ_\Sigma|}{|I_\Delta + jQ_\Delta|}$$ Equation 10

According to various embodiments of the disclosure, some (e.g., two) of the beamformed signals may be selected based on the signal magnitude of the generated beamformed signals, and used for the direction finding. For example, top two beamforming signals may be selected based on the signal magnitude for the direction finding.

The monopulse scheme may exhibit the direction finding performance of the solid line of FIG. 15, and the method according to an embodiment of the disclosure may exhibit the direction finding performance of the dotted line of FIG. 13.

As the result of the comparison, in the direction finding according to the direction finding method according to various embodiments of the disclosure, the magnitude variation of the four beamformed signals may be acquired in the range of 2 dB according to the incidence angle merely through one switch operation and good direction finding performance may be identified.

An apparatus and a method according to various embodiments of the disclosure may generate a plurality of beamformed signals using a plurality of received signals, and thus generate more beamformed signals than the received signals by use of receivers which are smaller in number than the received signals.

The methods according to the embodiments described in the claims or the specification of the disclosure may be implemented in hardware, software, or a combination of hardware and software.

For the software implementation, a computer-readable storage medium which stores one or more programs (software modules) may be provided. One or more programs stored in the computer-readable storage medium may be configured for execution by one or more processors of an electronic device. One or more programs may include instructions for enabling the electronic device to execute the methods according to the embodiments described in the claims or the specification of the disclosure.

Such a program (software module, software) may be stored to a random access memory, a non-volatile memory including a flash memory, a read only memory (ROM), an electrically erasable programmable read only memory (EE-PROM), a magnetic disc storage device, a compact disc (CD)-ROM, digital versatile discs (DVDs) or other optical storage devices, and a magnetic cassette. Alternatively, the programs may be stored to a memory combining part or all of them. In addition, a plurality of memories may be included.

In addition, the programs may be stored in an attachable storage device accessible via a communication network, such as Internet, Intranet, LAN, wide LAN (WLAN), or storage area network (SAN), or a communication network by combining these networks. Such a storage device may access an apparatus which realizes an embodiment of the disclosure through an external port. In addition, a separate storage device on the communication network may access the apparatus which realizes an embodiment of the disclosure.

In the specific embodiments of the disclosure as described above, the elements included in the disclosure are expressed in a singular or plural form. However, the singular or plural expression is appropriately selected according to a proposed situation for the convenience of explanations, the disclosure is not limited to a single element or a plurality of elements, the elements expressed in the plural form may be configured as a single element, and the elements expressed in the singular form may be configured as a plurality of elements.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A communication apparatus comprising:
   a plurality of antennas for identifying a plurality of radio signals; and
   a receiver for receiving the plurality of the radio signals via the plurality of the antennas,
   wherein the receiver comprises:
      a coupler circuit configured to couple the plurality of the received signals to different signal paths, to generate a first coupling signal by summing the plurality of the received signals and a second coupling signal corresponding to a difference of the plurality of the received signals, and
      a beam generator configured to generate a plurality of beamformed signals based on in-phase signals and quadrature-phase signals corresponding to the first coupling signal and the second coupling signal, and
   wherein the plurality of beamformed signals includes:
      a first beamformed signal being the in-phase signal of the first coupling signal,
      a third beamformed signal being the quadrature signal of the second coupling signal,
      a second beamformed signal determined by halving a first value, the first value summing a sum of the in-phase signal of the first coupling signal and the in-phase signal of the second coupling signal, and a subtraction of the quadrature-phase signal of the second coupling signal from the quadrature-phase signal of the first coupling signal, and
      a fourth beamformed signal determined by having a second value, the second value summing a sum of the quadrature-phase signal of the first coupling signal and the quadrature-phase signal of the second coupling signal and a subtraction of the quadrature-phase signal of the second coupling signal from the quadrature-phase signal of the first coupling signal.

2. The communication apparatus of claim 1, wherein the coupler circuit includes a 180° hybrid coupler.

3. The communication apparatus of claim 2, wherein the coupler circuit comprises a first signal path for generating the first coupling signal and a second signal path for generating the second coupling signal.

4. The communication apparatus of claim 3, further comprising:
   a switch circuit configured to selectively switch and output the first coupling signal and the second coupling signal from the coupler circuit.

5. The communication apparatus of claim 4, further comprising:
   a plurality of mixers configured to:
   convert frequency bands of the first coupling signal and the second coupling signal outputted from the switch circuit, into a baseband, and
   output a first baseband signal and a second baseband signal.

6. The communication apparatus of claim 5, further comprising:
   a plurality of filters configured to generate an in-phase signal and a quadrature-phase signal for each of the first baseband signal and second baseband signal outputted from the plurality of the mixers.

7. The communication apparatus of claim 6, wherein the beam generator is further configured to generate a plurality of beamformed signals based on the in-phase signal and the quadrature-phase signal of the first baseband signal and the in-phase signal and the quadrature-phase signal of the second baseband signal.

8. The communication apparatus of claim 7, further comprising:
   a processor configured to determine a direction of a transmitter which transmits the radio signal, based on a magnitude of the plurality of the beamformed signals.

9. The communication apparatus of claim 8, wherein the processor is further configured to:
   determine a direction of a transmitter which transmits the radio signal by selecting some of the plurality of the beamformed signals, based on the magnitude of the plurality of the beamformed signals.

10. The communication apparatus of claim 9, wherein some of the plurality of the beamformed signals are selected from over top 50% of the plurality of the beamformed signals in magnitude.

11. The communication apparatus of claim 10,
    wherein a number of the plurality of the antennas is greater than a number of the receivers, and
    wherein a number of the plurality of the beamformed signals is greater than the number of the plurality of the antennas.

12. A method comprising:
    identifying, at a plurality of antennas, a plurality of radio signals;
    receiving signals via the plurality of the antennas;
    generating a first coupling signal by summing the received signals, by coupling the received signals to different signal paths;
    generating a second coupling signal corresponding to a difference of the received signals;
    generating in-phase signals and quadrature-phase signals corresponding to the first coupling signal and the second coupling signal; and
    generating a plurality of beamformed signals based on the in-phase signals and the quadrature-phase signals,
    wherein the plurality of beamformed signals includes:
       a first beamformed signal being the in-phase signal of the first coupling signal,
       a third beamformed signal being the quadrature signal of the second coupling signal,
       a second beamformed signal determined by halving a first value, the first value summing a sum of the in-phase signal of the first coupling signal and the in-phase signal of the second coupling signal, and a subtraction of the quadrature-phase signal of the second coupling signal from the quadrature-phase signal of the first coupling signal, and
       a fourth beamformed signal determined by having a second value, the second value summing a sum of the quadrature-phase signal of the first coupling signal and the quadrature-phase signal of the second coupling signal and a subtraction of the quadrature-phase signal of the second coupling signal from the quadrature-phase signal of the first coupling signal.

13. The method of claim 12, wherein the generating of the second coupling signal comprising generating the second coupling signal using a 180° hybrid coupler.

14. The method of claim 13, wherein the generating of the first coupling signal and the second coupling signal has a first signal path for generating the first coupling signal and a second signal path for generating the second coupling signal.

15. The method of claim 14, further comprising:
    selectively switching and outputting the first coupling signal and the second coupling signal from a coupler circuit.

16. The method of claim 15, further comprising:
outputting a first baseband signal and a second baseband signal, by converting frequency bands of the outputted first coupling signal and second coupling signal into a baseband.

17. The method of claim 16, further comprising:
generating an in-phase signal and a quadrature-phase signal for each of the outputted first baseband signal and second baseband signal.

18. The method of claim 17, wherein the plurality of the beamformed signals are generated based on the in-phase signal and the quadrature-phase signal of the first baseband signal and the in-phase signal and the quadrature-phase signal of the second baseband signal.

\* \* \* \* \*